April 5, 1927.
J. D. KOHLER
1,623,926
HOLDER FOR CONFECTIONS AND NAPKINS
Filed Oct. 4, 1926
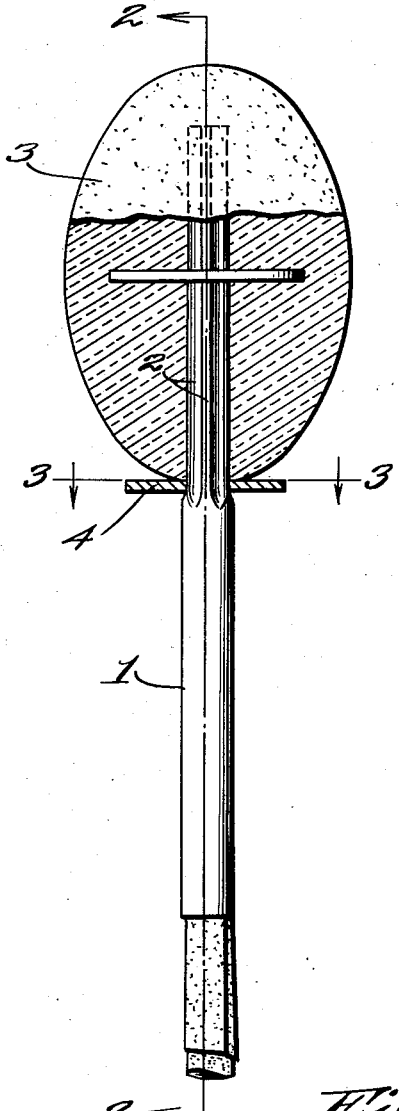
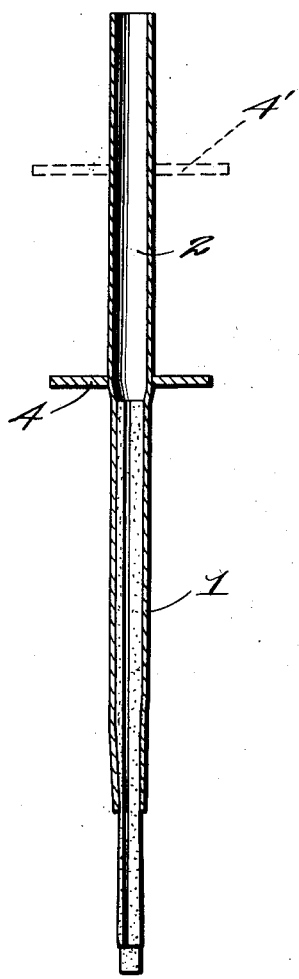
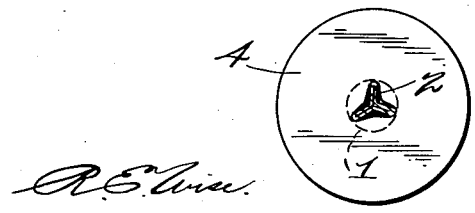
Jack D. Kohler
INVENTOR
BY Victor J. Evans
ATTORNEY
WITNESS:

Patented Apr. 5, 1927.

1,623,926

UNITED STATES PATENT OFFICE.

JACK D. KOHLER, OF MIAMI, FLORIDA.

HOLDER FOR CONFECTIONS AND NAPKINS.

Application filed October 4, 1926. Serial No. 139,500.

My present invention has reference to a combined anchor and napkin holder for confections, such as frozen confections.

An object is to simplify and improve the construction set forth in my copending application Serial No. 125,512, filed July 28, 1926.

To the attainment of the foregoing, the invention consists in the improvement as hereinafter described and definitely claimed.

In the drawings:—

Figure 1 is a side elevation of the improvement, part of the confection being in section.

Figure 2 is a sectional view approximately on the line 2—2 of Figure 1.

Figure 3 is a sectional view on the line 3—3 of Figure 1.

As disclosed by the drawings I make use of a tubular member 1. The member 1 may be of any desired material but is, of course, of a nature that will not inflict injury to the confection which is anchored in one end thereof. The tubular member 1 is creased longitudinally from one of its ends providing the said end of the tube with three angularly arranged flat ribs 2, and these ribs provide the anchor of the device. The anchoring ribs are designed to be anchored in the confection 3. However, before the anchor is inserted in the confection I arrange over the said anchor a protector disc 4. The disc has triangularly arranged slots through the center thereof through which the ribs provided by the anchor pass and the protector disc rests on the confection 3. Thus it will be noted that the disc prevents the hand of the user of the device coming directly in contact with the confection.

The confection is preferably of a type known as frozen dainties, but the improvement may be employed in connection with other confections and when inserted therein will be adhesively and firmly anchored in the confection.

The tube is designed as a holder for a napkin, and by the employment of the improvement the confection may be handled in a sanitary manner and the eater of the confection is provided with a napkin which will be found especially useful in eating the particular type of confection attached to the improvement.

While the disc 4 is primarily designed as a protector to prevent the hand of the user coming in contact with the confection, a second disc 4', similar to the disc 4 may be arranged on the anchor and embedded in the confection, as disclosed by the full lines in Figure 1 and the dotted lines in Figure 2 of the drawings.

Having described the invention, I claim:—

1. A combined handle and anchor for frozen or like sticky confections, comprising a tubular member having one of its ends pressed longitudinally to provide the same with angularly disposed flattened ribs that provide an anchor and close one end of the tube, the tubular portion affording a compartment for a napkin and a protector disc slidably arranged on the anchor end of the device.

2. A combined handle and anchor for frozen or like sticky confections, comprising a tubular member having one of its ends pressed longitudinally to provide the same with angularly disposed flattened ribs that provide an anchor and close one end of the tube, and a protector disc having central openings therethrough shaped to correspond to the anchor end of the device, arranged over said end.

In testimony whereof I affix my signature.

JACK D. KOHLER.